(12) United States Patent
Brown

(10) Patent No.: US 7,716,325 B2
(45) Date of Patent: May 11, 2010

(54) METHOD AND SYSTEM OF DETERMINING POSSIBLE CHANGE IN LOCATION OF NETWORK ELEMENT

(75) Inventor: Ralph W. Brown, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 640 days.

(21) Appl. No.: 11/562,009

(22) Filed: Nov. 21, 2006

(65) Prior Publication Data

US 2008/0120402 A1    May 22, 2008

(51) Int. Cl.
 *G06F 15/173* (2006.01)
(52) U.S. Cl. .................. 709/224; 370/352; 370/241

(58) Field of Classification Search ............... 709/224; 379/45; 307/241, 352
See application file for complete search history.

(56) References Cited

U.S. PATENT DOCUMENTS

| 2002/0132620 | A1* | 9/2002 | Saint-Hilaire et al. ....... 455/432 |
| 2006/0039290 | A1* | 2/2006 | Roden et al. ................. 370/241 |
| 2007/0124608 | A1* | 5/2007 | Knowlson et al. ........... 713/300 |
| 2007/0242660 | A1* | 10/2007 | Xu ............................... 370/352 |

\* cited by examiner

*Primary Examiner*—Quang N. Nguyen
*Assistant Examiner*—Ruolei Zong
(74) *Attorney, Agent, or Firm*—Brooks Kushman P.C.

(57) ABSTRACT

A method and system for determining a potential change in a physical location of a network element. The potential change being assessed to determine whether operating characteristics associated with the network element may reflect conditions and/or circumstances indicative of a possible change in the physical location of the network element.

19 Claims, 1 Drawing Sheet

METHOD AND SYSTEM OF DETERMINING POSSIBLE CHANGE IN LOCATION OF NETWORK ELEMENT

BACKGROUND OF THE INVENTION

1. Field of the Invention

The present invention relates to methods and systems associated with assessing a physical location of a network element and/or a user associated with the network element.

2. Background Art

The physical location of network elements can be important to network managers, emergency response entities, and other individuals concerned with the physical whereabouts of a user associated with the network element. For example, with the advent of VoIP and other so called "online" based communications, the ability to physically locate a user making a VoIP can be important, such as but not limited to emergency situations where the user may be attempting to make an emergency 911 (E911) call.

One known method of physically locating the user includes requiring the user to enter information regarding their physical location upon registering for VoIP services, such as by requiring the user to fill out a questionnaire and designate their intended location when making VoIP calls. This concept, however, fails to address the problem of the user physically changing the location of the VoIP device (network element) after such its registration, such as but not limited to when the user takes the VoIP device to another location when making a VoIP call.

There are any number of other examples where it may be desirable to determine the physical location of the network element itself, as opposed to the user associated therewith. For example, as more and more content is stored locally on STBs, DVRs, and other network elements, the network elements performing the storage may become rather valuable and susceptible to theft or value to inventory of content provider that relies on the network elements to source content. The ability to locate such high-valued network elements can be helpful in locating the items if stolen or simply performing inventory or other analysis.

Accordingly, there exits a need for methods and systems associated with assessing a physical location of a network element and/or a user associated with the network element.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
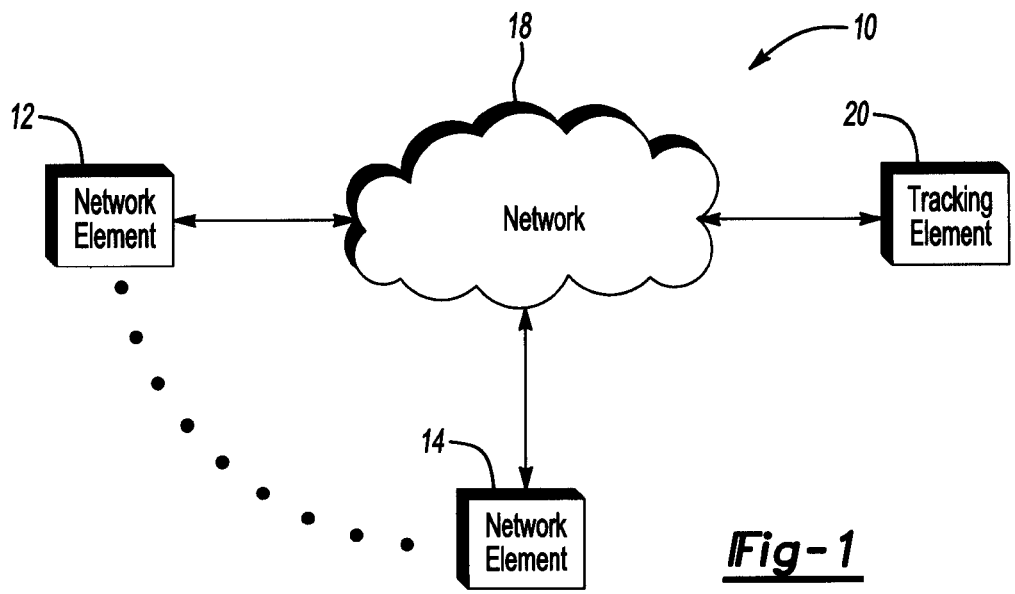
FIG. 1 illustrates an electronic system in accordance with one non-limiting aspect of the present invention.

FIG. 1 illustrates an electronic system 10 in accordance with one non-limiting aspect of the present invention. The system 10 generally includes a number of network elements 12-14 configured to electronically communicate signals over a network 18. For exemplary purposes only and without intending to limit the scope and contemplation of the present invention, the present invention is predominately described with respect to the system 10 being associated with a cable/satellite/internet system managed by a multiple system operator (MSO), such as but not limited to a cable system operator/service provider.

The MSO may be configured and/or otherwise associated with providing any number of services to any number of subscribers by way of the network elements 12-14 managing or facilitating communications over the network 18. The services may relate to television programming, video on demand (VOD), pay-per-view, interactive/enhanced television, high speed data, messaging, gaming, peer-to-peer transfer (P2P), and any number of other services. Of course, the present invention fully contemplates its application in any number of environments and is not intended to be limited to these or other services.

The network 18 may be associated with any one or more computer, data, cable, telecommunications, satellite, or other networks wherein signals are provided to and/or exchanged with the network elements 12-14. The system is shown with one illustrated network, however, the network 18 may be divided into any number of other networks, which may be controlled by the MSO, individuals, etc., including but not limited to public or private, virtual or dedicated, local or wide area (home, office, etc.) networks suitable for supporting communications between various network elements. As such, the present invention is not intended to be limited to the illustrated network or an MSO controlled network as the present fully contemplates the use and application to any number of networks.

The network elements 12-14 may include any number of devices or combination of devices having capabilities sufficient to interface the services with the user thereof. For example, the network elements may be settop boxes (STBs), cable modems (CMs), outlet digital adapters (ODAs), media termination devices (MTAs), routers, computers, televisions, phones, VoIP phones, and any number of other typically non-mobile devices associated with and/or required to support the services. These types of network elements are commonly referred to a customer premise equipment (CPE) or so called 'end client devices' as they are typically located at the customer premises or with the end device associated with interfacing the services with the user thereof.

As one skilled in the are will appreciate, any number of other network elements may be required to support interacting or otherwise supporting communications, signaling, and other operations associated with providing the services to the so called 'end client devices.' These network elements 12-14 may be associated with the network and/or otherwise related to the system 10, such as but not limited to routers, hubs, switches, gateways, conditional access routers (CARs), cable modem terminations systems (CMTSs), network provisioning units (NPUs), session boarder controllers, media gateways, media gateway controllers, call management servers, presence servers, SIP routing proxy, SIP registrar servers, PCMM policy servers, bandwidth on demand servers, streaming server caching proxies, gaming servers, media acquisition servers, unified messaging servers, and the like.

Of course, the present invention is not intended to be limited to the foregoing network elements and fully contemplates the use of any other or number of network elements 12-14. In particular, the present invention fully contemplates the use of other network elements 12-14 depending on the services associated with the system 10, such as but not limited to other network elements used to support telecommunications, satellite, data networking, and other services. Moreover, the network elements 12-14 need not be standalone functioning elements, as those described above. Rather, the network elements 12-14 may be integrated with other devices and/or software applications, computer-readable mediums, and other entities that may be standalone that are associable with some form of physical location. The present invention generally relates to network elements 12-14 of the type that connect or otherwise communication with the network. The type of network element 12-14 contemplated by the present invention is therefore relatively vast and non-limiting As one skilled in the art will appreciate, regardless of the services provided or associated with the network elements 12-14, it may be advantageous to know the physical location and whereabouts of the various network elements 12-14, such as but not limited to knowing the physical location in order to facilitate emergency 911 (E911) operations, theft recovery, inventory tracking, assets allocations, and any number of other actions dependent on determining or otherwise assessing the physical location of the network elements.

For the purposes of the present invention, the physical or geographical location of the network element is intended to comprise any set of instructions or descriptions that can be understood and used to locate the actual physical entity associated with the network elements 12-14. In this manner, the present invention contemplates the physical location information associated with the physical location to be suitable for use by a human or other entity in traveling to the network element 12-14, as opposed to instructions merely sufficient for supporting or actually communicating with the network element 12-14 over the network 18 (network address, IP address, etc.).

The physical or geographical location of the network elements 12-14 may be determined according to any number of methodologies and search functions. For example, prior to deployment or enablement, physical locations may be associated with the network elements 12-14, such as but not limited to inputting the physical location, i.e., address, positioning description (top-shelf, floor, coordinates, GPS, etc.), into a database (not shown), such as a tracking database associated with a tracking element 20.

The tracking element 20 may be standalone feature in the system 10 and/or integrated with another element of the system 10. The tracking element 20 may include any number of capabilities for communicating and processing information, including those required to execute the operations associated with the present invention. The tracking element 20 may allow an operator to input entries into the database that cross-references the network elements 12-14 with unique identifiers (MAC address, etc.) and an associated descriptions of its physical location and/or other information associated therewith.

Once the network element 12-14 is deployed and enabled/provisioned to interact with the network 18, the database may be updated, by the operator or the tracking element 20, to include other information for the network element 12-14, such as but not limited to its provisioning status/instructions, operation/configuration profile, network address (IP address, etc.), subnet ID, etc. The database may be maintained by the MSO or some other entity associated with supporting or managing the network 18 or arrangement of networks if multiple networks are employed to deliver services. In this manner, the physical location, communication requirements, and other parameters may be tracked and monitored for the network elements 12-14.

One problem faced by the MSO and addressed by the present invention relates to updating or otherwise assessing whether the known physical location of the network elements 12-14 is still valid and/or accurate with respect to the actual location of the network element 12-14. It may be desirable to re-evaluate, refresh, or otherwise confirm the physical location of the network elements 12-14 over time so that the information in the database is current and sufficient for use in locating the network elements. For example, E911 situations require up to date information in order to assure emergency responders reach the proper location when an E911 call is made from one of the network elements 12-14.

The tracking element 20 may be configured to continuously poll or otherwise query the network elements 12-14 for their physical location and/or perform other operations associate therewith. Depending on the number of network elements 12-14, the processing required by the tracking element 20, operator, MSO, or other network elements 12-14 may be overly burdensome and costly. Optionally, the network elements 12-14 themselves and/or the tracking element 20 may be configured to determine whether a potential change in the physical location of the network element 12-14 is possible.

In this manner, processing time and costs may be saved if updating of the database (or other entity associated with tracking the network elements) is limited to conditions under which it is possible that the network element 12-14 has changed locations. The tracking element 20, operator, MSO, or other features associated with the network 12-14 may thereafter contact or otherwise communicate with the suspected network element 12-14 to determine if its physical location has actually changed. If the physical location has changed, any number of operations may be undertaken to identify the new location and to update or otherwise alter the database to reflect the new or temporary location.

Figure 2:
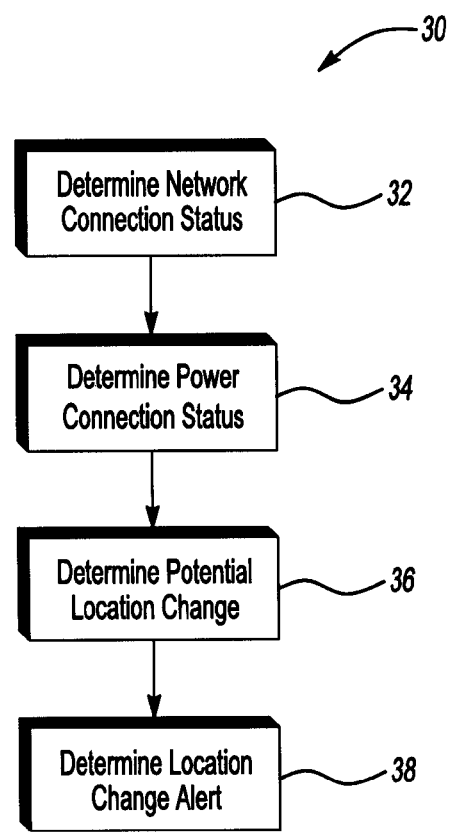
FIG. 2 illustrates a flowchart of a method of determining whether a potential change in the physical location of a network element is possible in accordance with one non-limiting aspect of the present invention.

FIG. 2 illustrates a flowchart 30 of a method of determining a potential change in the physical location of a network element is possible in accordance with one non-limiting aspect of the present invention. The method may be embodied in a computer-readable medium and/or otherwise executed by a logically function entity, such as but not limited to the network elements themselves and/or the tracking element, having capabilities sufficient to coordinate one or more of the steps described below, either as a standalone item or in connection with human assistance.

For exemplary purposes, the method is described with respect to determining the potential change in the physical location of a single network element. This description is not intended to limit the present invention to determining the potential change in location of one network element or one network element at time. The present invention fully contemplates independently or simultaneously executing one or more of the steps in order to determine the potential change in location for one or more network elements.

Block 32 relates to determining a network connection status for one of the network elements. The connection status may be used to indicate whether a network connection between the network element and the network has been physically disconnected by a user desiring to move the network element. For example, the network connection status may indicate a disconnect if a wireline (or wireless) connection element used to electrically connect the network element to the network is removed, i.e., by simply determining whether the physical cable connection of the network element to the network has be removed.

This determination may be made by the network element and/or the tracking element polling the network connection of the network element. Optionally, the network element may include a battery or an energy backup source having sufficient capabilities to maintain functionality needed to support locally testing for the network connection if a primary operational power source used to otherwise power operations of the network element is unavailable, such as if electrical power at the location is lost, a outlet wall plug is disconnected, etc.

The network connection status of the network element may be stored locally on the network element, such as by updating a management information base (MIB) variable or other database, and/or by the tracking element. The network connection status can be useful in assessing whether the physical location of the network element is likely to have changed, i.e., it is unlikely that the physical location of the network element has changed if the physical connection to the network has not be disconnected. The ability to power the network element with the battery backup allows the network connection to be tested even after loss of the operational power source typically used to power the network element. This may be beneficial in preventing false failures in determining the network connection status.

Block 34 relates to determining a power source connection status for the network elements. The connection status may be used to indicate whether the primary operational power source used to power operations of the network element is still physically connected to a wall outlet or other continuous source of power. For example, the power source connection status may indicate a disconnect if a power cord used to electrically connect the network element to the primary power source is removed, i.e., by simply determining whether the physical connection to the wall outlet has be removed.

This determination may be made by the network element and/or the tracking element polling the network element. Optionally, the battery backup up of the network element may maintain network element functionality for a sufficient period of time after power loss to support locally testing for the power source connection. The power source connection test may include any number of tests associated with determining the physical connection, such as but not limited to emitting signals from the network element to the wall outlet to test for electrical connectivity, i.e., the power source is disconnected when there is no connectivity and connected when there is connectivity. This may be beneficiation in prevent false positives if power to power source is lost due to a broad power outage, as electrically connectivity is likely to be available as long as the physical connection to the continuous source of power is intact.

The power source connection status of the network element may be stored locally on the network element, such as by updating the MIB variable or other database, and/or by the tracking element. The power source connection status can be useful in assessing whether the physical location of the network element is likely to have changed, i.e., it is unlikely that the physical location of the network element has changed if the physical connection to the primary power source has not be disconnected. The ability to test for the power source connection after loss of the operational power source may be beneficial in preventing false failures in determining the power source connection status.

Block 36 relates to determining whether the potential change in the physical location of the network element is possible as a function of the network and power source connection statuses. The potential change in the physical location of the network element is intended to reflect conditions under which it is possible that the physical location of the network element may have changed. If conditions suitable to changing the location of the network element have occurred and/or are possible, it may be desirable to update the location information associated with the network element so that an accurate recording of the current location of the network element may be determined.

The potential change may be deemed possible if both of the network and power source connection statuses indicate the physical disconnection of the network and power source connections. Disconnection of both of these features may be required in order to relocate the network element to the another location. Conversely, the potential change may be deemed impossible if one or neither of the statuses indicate a disconnect of the network or power source connections as the remaining connection of at least one of these features may make it impossible to relocate the network element.

Block 38 relates to alerting of the potential change in the physical location of the network element if such a change is possible. The alert maybe generated by the network element and/or the tracking element. The alert may be a message that identifies the new physical location or one that only identifies a need to update the physical location of the network element, i.e., it may not identify the new physical location and/or it may not be converted/translated to identify the physical location. For example, when the network element is reconnected to the network, optionally with or without reconnection of the primary power source, it may be configured to broadcast the alert to the tracking element or other element associated with determining the physical location of the network element. Likewise, the alert may be stored on the network element such that it may be discovered through polling operations conducted by the tracking element upon reconnection of the network element to the network.

Broadcasting of the alert by the network element may be advantageous for E911 operations, theft recovery, or if the network element is connected to a network isolated form the tracking element as such an alert may be broadcasted accordingly to a commonly understood protocol used by other entities in communication with the network, such as emergency response entities, so that the other entities can interpret the alert and understand its nature without necessarily having any previous knowledge of the network element.

Optionally, Block 38 may include overriding the alert to avoid false positives or other inconsistencies. The override may include preventing transmission of the alert, removing an alert status flag from the MIB, and/or taking some other action related thereto. Any number of conditions may be monitored for use in determining the override condition, including but not limited to a period of time associated with the disconnects and/or the subnet address of the network address of the network element.

The disconnect period of time override may relate to requiring disconnect of the primary power source and/or network connection for a predefined period of time, such as but not limited to a period of time sufficient to avoid inadvertent conditions where one or both of the network cable and power cable may be accidentally removed or removed for a short period of time to permit local reconnect, such as but not limited to when a user desires to move the network element from one location to another local location.

The subnet address override may relate to requiring a change in the subnet ID associated with the network address of the network element. The subnet ID may be helpful in identifying when the network connection has been temporary removed or locally relocated versus whether the network element has actually been relocated to another network having have a different subnet ID. The network element and/or tracking element may store the previous subnet ID for use in making this determination.

As noted above, one non-limiting aspect of the present invention may relate to detecting when a battery-backed, broadband-IP based CPE (for example, a PacketCable 1.5 MTA, or other battery-backed, VoIP terminal) has potentially been relocated to a new address or household. This detection may rely on the premise or address that the CPE be disconnected from both the power supply (typically an AC power adapter) and the network (cable, FTTH, or Ethernet) before it can be physically moved. The CPE may be battery-backed in order for the CPE to detect this condition of being from both power and network. There are many conditions that may give rise to the device being disconnected from both power and network, aside from physically relocation. Consequently, false positives may be compensated for with a time threshold used to insure that the CPE is disconnected for sufficient time to reasonably be physically relocated to an alternative household or address. In addition, other network parameters can be used to confirm relocation to a new household or address, such as a change in the IP subnet of the IP address allocated to the CPE, when it is reconnected to the network.

The present invention may be of particular importance to E911 services, where knowledge of the location of the CPE is critical to insure emergency services are dispatched to the correct household. Even the knowledge that location information that has been provisioned into the CPE at the time of service activation is potentially unreliable is of benefit in E911 circumstances. If the 911 operator knows that the location information provided via E911 services is potentially incorrect, the 911 operator can ask the 911 caller if the address information is correct before dispatching emergency personnel. Other applications where relocation of CPE is important can be envisioned, for example movement of high-value content contained in a set-top DVR from a private residence to an alternative location, potentially a public environment where fair use of the content is violated.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of determining a potential change in a physical location of a network element, wherein the network element is a device configured to exchange messages with a network, the network element having a network connection used to interface network signals with a network and an operational power source used to power operations associated with the network element, the method comprising:
   the network element determining a network connection status for the network connection;
   the network element determining a power source connection status for the operational power source;
   the network element determining the potential change in the physical location of the network element to be possible only in the event the network and power source connection statuses indicate the network element to be disconnected from both of the network connection and the operation power source; and
   the network element transmitting an alert to indicate a need to determine a new physical location for the network element only after the network element is reconnected to the network and without the network element transmitting data representative of the new physical location.

2. The method of claim 1 further comprising the network element transmitting the alert only in the event a time period during which both of the network connection and power source connection are disconnected is greater than a predefined time threshold.

3. The method of claim 1 further comprising the network element determining the network and power source connection statuses after the operational power source is disconnected.

4. The method of claim 1 further comprising a tracking element connected to the network querying the network element upon receipt of the alert the query requesting the network element to generate a response, the tracking element determining the new physical location from routing information used to guide the response to the tracking element.

5. A method of determining a potential change in a physical location of a network element, wherein the network element is a device configured to exchange messages with a network, the method comprising:
   a tracking element determining the potential change in the physical location of the network element is possible as a function of network and power source connections for the network element;
   the tracking element querying the network element upon determining the potential change in the physical location to be possible, the network element awaiting receipt of a query message from the tracking element before transmitting information sufficient to identify a new location of the network element; and
   determining the potential change in the physical location of the network element to be possible only if both of the network and power source connections are disconnected.

6. The method of claim 5 further comprising determining the potential change in the in the physical location of the network element to be impossible if at least one of the network and power source connections are connected.

7. The method of claim 5 further comprising storing an alert on the network element if the potential change in the physical location of the network element is possible such that the tracking element associated with tracking the network element is apprised of the alert only after reconnecting the network connection.

8. A system for tracking location of a network element, wherein the network element is a device configured to exchange messages with a network, used to support VoIP communications, the network element requiring a first amount of power in order to support a VoIP phone call comprising:
   a tracking element associated with referencing a physical location of the network element and updating the physical location upon determining a potential change in the physical location as a function of an alert generated by the network element;
   wherein the network element is configured to generate an alert as a function of whether network and power source connections used to respectively connect the network element to a network and an operation power source are both disconnected;

wherein the network element includes a battery having energy sufficient to power the network element with a second amount of power in the event the power source is disconnected, the second amount of power being less than the first amount of power needed by the network element to conduct a VoIP phone call but sufficient to test the network connection;

wherein the network element is configured to determine disconnect of the network connection upon an inability to transmit a test message over the network while the battery is powering the network element due to the power source being disconnected;

wherein the alert indicates the potential change in the physical location of the network element is possible only if both of the network and power source connections are disconnected.

9. The system of claim 8 wherein the network element is a VoIP phone and the tracking element is associated with determining the potential change in the physical location of the VoIP phone in order to facilitate L911 locating, wherein the tracking element instructs an L911 operator to request an update of the physical location of the VoIP phone to support the L911 locating if the alert indicates the potential change in the physical location of the VoIP phone to be possible.

10. The system of claim 8 wherein the alert notifies the tracking element of the potential change in the physical location and does not identify a new location of the network element.

11. The system of claim 10 wherein the new location is determined only after the tracking element receives the alert.

12. The system of claim 11 wherein the network element identifies the new location in a message communicated after communication of the alert.

13. The system of claim 11 wherein the tracking element identifies the new location.

14. The system of claim 8 wherein the alert identifies a new location of the network element.

15. The method of claim 1 further comprising the network element transmitting the alert only in the event a subnet address of the network connection determined after reconnection is different from a subnet address of the network element determined prior to reconnection.

16. The method of claim 1 further comprising a remote tracking element determining the new physical location of the network element from information conveyed within a telephone call by a subscriber associated with the network element and entered into a database by an operator.

17. The method of claim 5 further comprising the tracking element determining the new physical location of the network element from information conveyed within a telephone call by a subscriber associated with the network element and entered into a database by an operator.

18. The method of claim 5 further comprising the query message requesting the network element to generate a response, the tracking element determining the new physical location from routing information used to guide the response to the tracking element and without the network element transmitting data that specifically identifies the new location.

19. The method of claim 18 wherein the routing information is a subnet address.

* * * * *

UNITED STATES PATENT AND TRADEMARK OFFICE
CERTIFICATE OF CORRECTION

PATENT NO.        : 7,716,325 B2
APPLICATION NO. : 11/562009
DATED             : May 11, 2010
INVENTOR(S)       : Ralph W. Brown It is certified that error appears in the above-identified patent and that said Letters Patent is hereby corrected as shown below:

Column 9, Line 23, Claim 9:

Delete "L911 locating" and insert --E911 locating--.

Column 9, Line 24, Claim 9:

Delete "L911 operator" and insert --E911 operator--.

Column 9, Line 26, Claim 9:

Delete "L911 locating" and insert --E911 locating--.

Signed and Sealed this

Twentieth Day of July, 2010

David J. Kappos
*Director of the United States Patent and Trademark Office*